United States Patent
Fukuda

(10) Patent No.: US 7,633,650 B2
(45) Date of Patent: Dec. 15, 2009

(54) APPARATUS AND METHOD FOR PROCESSING BINARY IMAGE PRODUCED BY ERROR DIFFUSION ACCORDING TO CHARACTER OR LINE DRAWING DETECTION

(75) Inventor: Hiroaki Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 362 days.

(21) Appl. No.: 10/910,306

(22) Filed: Aug. 4, 2004

(65) Prior Publication Data

US 2005/0031203 A1    Feb. 10, 2005

(30) Foreign Application Priority Data

Aug. 8, 2003  (JP) .............................. 2003-290632
Jul. 26, 2004  (JP) .............................. 2004-217657

(51) Int. Cl.
*H04N 1/403*  (2006.01)
*H04N 1/405*  (2006.01)
*H04N 1/409*  (2006.01)
*G06K 9/46*  (2006.01)

(52) U.S. Cl. ................ 358/2.1; 358/3.03; 358/3.24; 358/3.27; 358/462; 382/176; 382/192; 382/252

(58) Field of Classification Search .......... 358/1.9, 358/2.1, 3.03–3.06, 3.21, 3.24, 3.26, 3.27, 358/534, 462; 382/252, 237, 176, 194, 199, 382/205, 266, 269, 275, 192, 195

See application file for complete search history.

(56) References Cited

U.S. PATENT DOCUMENTS

| | | | |
|---|---|---|---|
| 4,400,738 A | | 8/1983 | Tomory et al. |
| 4,668,995 A | | 5/1987 | Chen et al. |
| 4,862,283 A | | 8/1989 | Smith et al. |
| 4,876,610 A | * | 10/1989 | Ohsawa et al. ............. 358/3.05 |
| 4,953,013 A | * | 8/1990 | Tsuji et al. ................. 358/462 |

(Continued)

FOREIGN PATENT DOCUMENTS

JP         61-194968         8/1986

(Continued)

OTHER PUBLICATIONS

Japanese Office Action dated Feb. 24, 2009, issued in related Japanese Application No. JP 2004-217657.

(Continued)

*Primary Examiner*—Scott A Rogers
(74) *Attorney, Agent, or Firm*—Dickstein Shapiro LLP

(57) ABSTRACT

An image processing apparatus can obtain a copy image having excellent reproducibility with a relatively simple structure of a processing unit that processes image data. The image processing apparatus generates image formation data by processing image data. A gradation processing unit binarizes the image data according to an error diffusion process so as to convert the image data into binary image data. A character/line drawing detection unit determines whether a part of the binary image data corresponds to a character/line drawing portion that consists of characters or line drawings so as to detect the character/line drawing portion. An image processing unit applies an image processing to the part of the binary image data by using an image processing method according to a result of determination of the character/line drawing detection unit.

14 Claims, 7 Drawing Sheets

U.S. PATENT DOCUMENTS

| | | | |
|---|---|---|---|
| 5,018,024 A | 5/1991 | Tanioka | |
| 5,193,122 A | 3/1993 | Kowalski et al. | |
| 5,243,445 A * | 9/1993 | Koike | 358/462 |
| 5,317,419 A | 5/1994 | Koizumi et al. | |
| 5,701,363 A | 12/1997 | Hanyuh | |
| 5,712,927 A * | 1/1998 | Kim et al. | 382/252 |
| 5,920,646 A | 7/1999 | Kamon et al. | |
| 6,175,425 B1 | 1/2001 | Khorram | |
| 6,201,612 B1 * | 3/2001 | Matsushiro et al. | 358/1.9 |
| 6,385,344 B2 * | 5/2002 | Irie et al. | 358/1.9 |
| 6,763,473 B1 | 7/2004 | Oteki et al. | |
| 6,862,101 B1 | 3/2005 | Miyazaki et al. | |
| 6,930,793 B1 | 8/2005 | Namizuka et al. | |
| 6,963,420 B1 | 11/2005 | Kawamoto et al. | |
| 6,977,757 B1 * | 12/2005 | Takahashi et al. | 358/3.05 |
| 7,072,058 B1 | 7/2006 | Miyazaki et al. | |
| 7,161,714 B1 | 1/2007 | Namizuka et al. | |
| 7,292,372 B2 * | 11/2007 | Fukuda et al. | 358/2.1 |
| 7,301,674 B2 * | 11/2007 | Feng et al. | 358/3.03 |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0018244 A1 | 2/2002 | Namizuka et al. | |
| 2002/0027670 A1 | 3/2002 | Takahashi et al. | |
| 2003/0090742 A1 | 5/2003 | Fukuda et al. | |
| 2003/0184808 A1 | 10/2003 | Fukuda et al. | |
| 2006/0291732 A1 * | 12/2006 | Bai et al. | 382/252 |

FOREIGN PATENT DOCUMENTS

| | | | |
|---|---|---|---|
| JP | 63301677 A * | 12/1988 | |
| JP | 6-66884 | 8/1994 | |
| JP | 07-066975 A | 3/1995 | |
| JP | 07-066976 A | 3/1995 | |
| JP | 08-214156 A | 8/1996 | |
| JP | 9-233323 | 9/1997 | |
| JP | 9-270912 | 10/1997 | |
| JP | 2001-268348 A | 9/2001 | |
| JP | 2003-46771 | 2/2003 | |

OTHER PUBLICATIONS

Japanese Office Action dated Sep. 9, 2008 issued in related Japanese Patent Application No. JP 2004-217657.

* cited by examiner

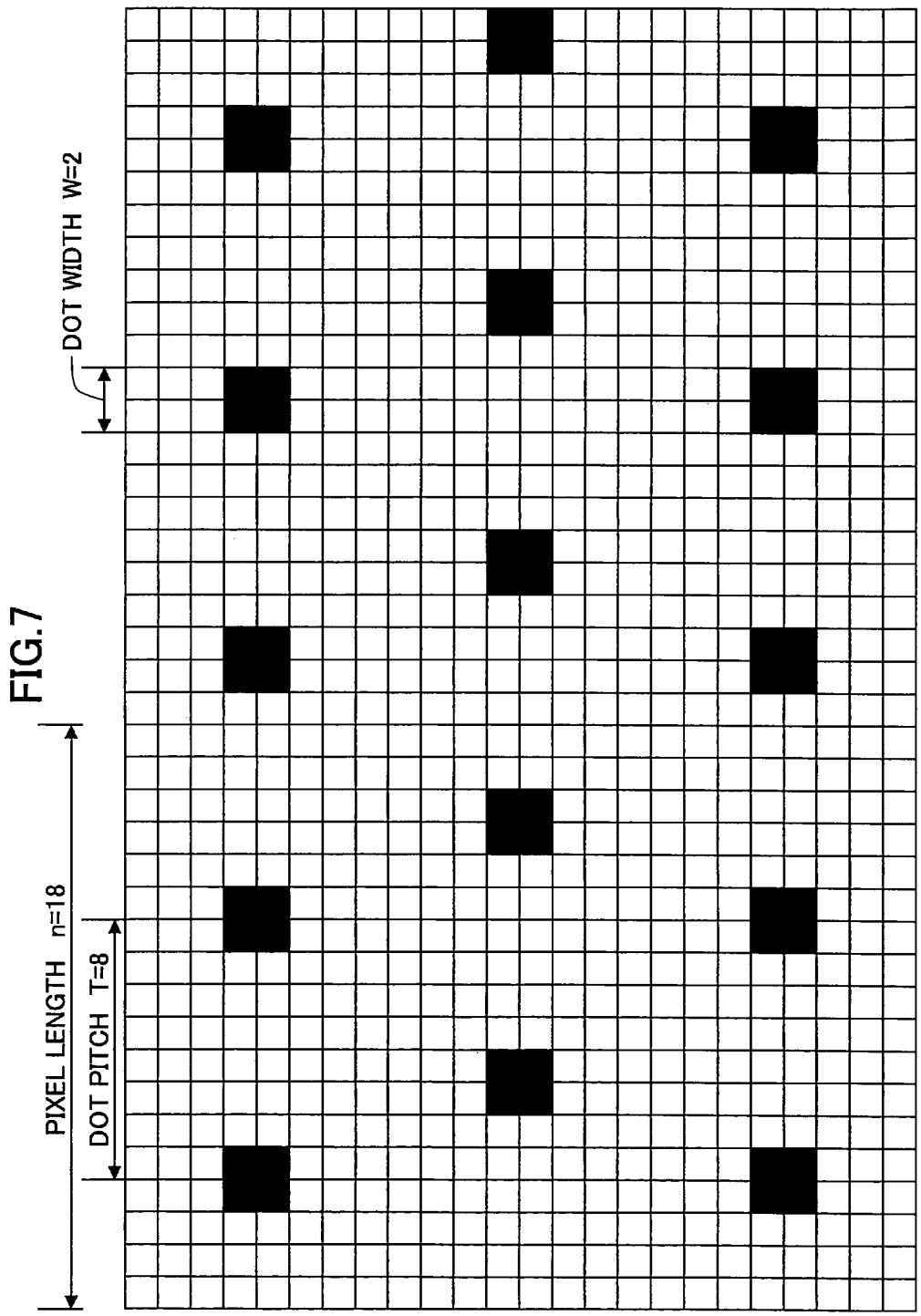

APPARATUS AND METHOD FOR PROCESSING BINARY IMAGE PRODUCED BY ERROR DIFFUSION ACCORDING TO CHARACTER OR LINE DRAWING DETECTION

BACKGROUND OF THE INVENTION

1. Field of the Invention

The present invention generally relates to image processing apparatuses and, more particularly, to an image processing apparatus, an image forming apparatus and an image forming method that detect a kind of images represented by binary image data, which is binarized according to an error diffusion method, so as to apply an appropriate image processing method to the binary image data in accordance with the result of detection.

2. Description of the Related Art

A document image comprises a character image, a drawing image including lines and curves, a character image or a drawing image provided with screening, a photograph image, or a combination of the aforementioned images. A copy machine that makes a copy of such an original document image converts the document image into digital imaged data, and applies various correction processes to the digital image data in accordance with the contents of the document image so as to reproduce a copy image closer to the original document image.

For example, a correction process that gives weight to sharpness is suitable for a document having contents such as a drawing consisting of only characters and lines. The document image consists of only a black part (bit information="1111") corresponding to the characters and lines and a while part (bit information="0000") where no character or line is drawn. Accordingly, a correction process is applied to well-define the black part and the white part (a correction process that gives weight to sharpness). According to such a correction process being applied to image data, a copy image having a well-defined contour of a character can be reproduced.

On the other hand, a correction process that gives weight to gradation is suitable for a correction to an original document having contents such as a photograph, a color picture, etc. If, for example, an original document is a photograph of sixteen gradation levels of black and white, the original document is composed of pixels of intense black (bit information="1111"), stark white ("0000"), light gray ("0010") and dark gray ("1100"). Since the bit information of consecutive pixels changes smoothly in general, that is, there is no sharp change in the bit information between adjacent pixels, it is necessary to apply a smooth correction (a correction that gives weight to gradation).

As appreciated from the above explanation, the correction that gives weight to sharpness and the correction that gives weight to gradation are conflict with each other. For example, if the correction that gives weight to sharpness is applied to image data of a photographic image, a reproduced image according to the corrected image data may become a so-called jugged reproduction image that lacks spatial effect. On the other hand, if the correction that gives weight to gradation is applied to a character or line drawing, a reproduced image according to the corrected image data may become a so-called blurry reproduction image that has unclear outlines.

Thus, even if an original document image contains both a character image and a photographic image, a reproduced image closer to the original document image can be obtained by applying a suitable image processing in accordance with portions of the original document image corresponding to the character image and the photographic image. For example, there is suggested, as a conventional technique, a technique with respect to a method of discriminating a dot-photograph, which discriminates a dot-photograph area and a non-dot-photograph area (an area of characters or line drawing) in an input image in accordance with a result of measurement of a signal level difference between two consecutive pixels or a change in the sign (plus or minus) of the pixels with respect to both a main scanning direction and a sub-scanning direction (refer to Japanese Patent Publication No. 6-66884).

Additionally, there is suggested a technique with respect to a digital image reading apparatus, which can prevent a reproduced image from being degraded by applying either an image processing that gives priority to resolution or an image processing that gives priority to gradation in accordance with a result of determination as to whether a target pixel in input digital image data is in a character area or in a picture area (refer to Japanese Laid-Open Patent Application No. 9-233323).

Further, there is suggested a technique with respect to an image processing apparatus, and image processing method and an image forming apparatus, which divides an input image into a plurality of portions and determined whether or not each divided portion is a specific portion (such as a photograph, etc.) so as to perform an image processing that gives weight to gradation when each divided portion is the specific portion and perform an image processing that gives weight to sharpness when each divided portion is not the specific portion (refer to Japanese Laid-Open Patent Application No. 2003-467719).

The method of detecting an image portion according to the above-mentioned technique is suitable for detecting an image portion from image data before being converted into binary image data, that is, suitable for detecting an image portion from multi-value image data. However, the method of detecting an image portion according to the conventional technique is not suitable for the detection performed on the binary image data since the binary image to which an error diffusion process has been applied is generated by converting multi-gradation-level image into pseudo-halftone data, which contains black dots and white dots so as to represent various gray colors by changing a density of the black dots relative to the white dots. Therefore, in order to detect an image portion from image data to be transmitted to a plotter (write unit), it is necessary to detect an image portion from image data after the binarizing process.

Moreover, the detection method according to the conventional technique, a determination process of an image portion is performed in both the main-scanning direction and the sub-scanning direction. That is, since an amount of computation is about twice, a memory area must be increased accordingly. Moreover, since the multi-value image contains bit information from "0000" to "1111" in the case of sixteen gradation levels while the binary image contains bit information of "0" and "1", the processing of the multi-value image requires a larger memory area than the processing of the binary image. Consequently, the processing of the multi-value image requires a large amount of computation, which results in an increase in the size and cost of the apparatus that performs the image processing. Thus, it is desirous to provide a relatively inexpensive apparatus by simplifying the structure of the apparatus while maintaining reproducibility of a reproduced image.

Moreover, in the conventional technique, a smoothing process is applied to the whole binary image so that the smoothing process matches only a character/line portion or matches only a non-character/line portion (photograph, etc.) or matches an intermediate between the two. If a strong smoothing that gives weight to the character/line portion is applied, there is no jaggy occurs in characters and lines, which results in a copy image having clear outlines, but a photograph portion or the like turns into a copy image having poor reproducibility. On the contrary, if a gentle smoothing that gives weight to the non-character/line portion is applied or no smoothing is applied, excellent reproducibility is obtainable for the non-character/line image, but reproducibility of the non-character/line image is poor. Additionally, the smoothing process for the intermediate between the character/line image and the non-character/line image may reproduce a copy image, which is insufficient for both the character/line image and the non-character/line image. Thus, in order to improve the reproducibility of a copy image, it is necessary to perform an image processing according to each image portion of the original document.

SUMMARY OF THE INVENTION

It is a general object of the present invention to provide an improved and useful image processing apparatus in which the above-mentioned problems are eliminated.

A more specific object of the present invention is to provide an image processing apparatus which can obtain a copy image having excellent reproducibility with a relatively simple structure of a processing unit that processes image data.

In order to achieve the above-mentioned invention, there is provided according to one aspect of the present invention an image processing apparatus for generating image formation data by processing image data, comprising: a gradation processing unit that binarizes the image data according to an error diffusion process so as to convert the image data into binary image data; a character/line drawing detection unit that determines whether a part of the binary image data corresponds to a character/line drawing portion that consists of characters or line drawings so as to detect the character/line drawing portion; and an image processing unit that applies an image processing to the part of the binary image data by using an image processing method according to a result of determination of the character/line drawing detection unit.

According to the present invention, an image portion, which corresponds to the character/line drawing portion consisting of character/line drawings is detected, and an image processing such as a smoothing process is applied to a portion of the binary image data, which corresponds to the character/line drawing portion and the portion of the binary image data, which corresponds to the non-character/line portion consisting of images other than the character/line drawings, in accordance with a result of the detection the image portion corresponding to the character/line drawing portion. Thus, an appropriate image processing can be selectively applied to the character/line drawing portion and the non-character/line drawing portion, thereby achieving an image processing apparatus, which can provide high reproducibility.

The image processing apparatus according to the present invention may further comprise an image dividing unit that divides the binary image data into a plurality of image portions each containing a predetermined number n of pixels which is arranged along a single line, and wherein the character/line drawing detection unit determines whether or not each of the image portions corresponds to the character/line drawing portion.

In the above-mentioned image processing apparatus, the character/line drawing detection unit may obtain a number of transition points at which the pixels in each of the image portions changes from white to black or from black to white, and may determine whether or not each of the image portions corresponds to the character/line drawing portion by comparing the number of transition points with a threshold value.

In the above-mentioned image processing apparatus, the character/line drawing detection unit may obtain the number of transition points by performing an exclusive OR operation on each pair of adjacent pixels in each of the image portions.

In the above-mentioned image processing apparatus, the character/line drawing detection unit may determine that each image portion corresponds to the character/line drawing portion when the number of transition points is equal to or smaller than the threshold value.

The image processing apparatus according to the present invention may further comprise an image combining unit that combines the image portions that have been subjected to the image processing by the image processing unit so as to generate the image formation data to be used in an image formation process.

In the image processing apparatus according to the present invention, the image data may be supplied from an image reading unit that acquires the image data by optically reading an original document. Or, the image data may be supplied from an electronic equipment connected through a data communication means. Or, the image data may be facsimile data supplied through a telephone line.

The image processing apparatus according to the present invention may further comprise an image forming unit that forms a visible image by using the image formation data.

Additionally, there is provided according to another aspect of the present invention an image forming apparatus comprising: an image processing apparatus that generates image formation data by processing image data; and an image forming unit that forms a visible image by using the image formation data supplied from the image processing apparatus, wherein the image processing apparatus comprises: a gradation processing unit that binarizes the image data according to an error diffusion process so as to convert the image data into binary image data; a character/line drawing detection unit that determines whether a part of the binary image data corresponds to a character/line drawing portion that consists of characters or line drawings so as to detect the character/line drawing portion; and an image processing unit that applies an image processing to the part of the binary image data by using an image processing method according to a result of determination of the character/line drawing detection unit.

Further, there is provided according to another aspect of the present invention an image processing method for generating image formation data by processing image data, comprising: binarizing the image data according to an error diffusion process so as to convert the image data into binary image data; determining whether a part of the binary image data corresponds to a character/line drawing portion that consists of characters or line drawings so as to detect the character/line drawing portion; and applying an image processing to the part of the binary image data by using an image processing method according to a result of determination in the determining step.

The image processing method according to the present invention may further comprise: dividing the binary image data into a plurality of image portions each containing a predetermined number n of pixels which is arranged along a single line; and determining whether or not each of the image portions corresponds to the character/line drawing portion.

The image processing method according to the present invention may further comprise: obtaining a number of transition points at which the pixels in each of the image portions changes from white to black or from black to white; and determining whether or not each of the image portions corresponds to the character/line drawing portion by comparing the number of transition points with a threshold value.

The image processing method according to the above-mentioned invention may further comprise obtaining the number of transition points by performing an exclusive OR operation on each pair of adjacent pixels in each of the image portions.

The image processing method according to the above-mentioned invention may further comprise determining that each image portion corresponds to the character/line drawing portion when the number of transition points is equal to or smaller than the threshold value.

The image processing method according to the present invention may further comprise combining the image portions that have been subjected to the image processing so as to generate the image formation data to be used in an image formation process.

Other objects, features and advantages of the present invention will become more apparent from the following detailed description when read in conjunction with the accompanying drawings.

BRIEF DESCRIPTION OF THE DRAWINGS

FIG. 7 is an illustration of a part of a document image corresponding to a halftone dot portion for explaining a method of determining pixel length and a threshold value.

DETAILED DESCRIPTION OF THE PREFERRED EMBODIMENT

In order to achieve an image processing apparatus that can provide extended versatility to users, the image processing apparatus according to the present invention is capable of adopting one of a plurality of document image acquiring units. Additionally, in order to simplify the structure of the image processing apparatus, the following two structures are adopted in the image processing apparatus: 1) a binary image is divided only along one scanning direction; and 2) a number of transition points in a single line of a binary image (containing bit information of "1" and "0") is counted to determine a kind of an image portion, the counting being performed by summing a result of an exclusive OR operation performed on adjacent two pixels.

Figure 1:
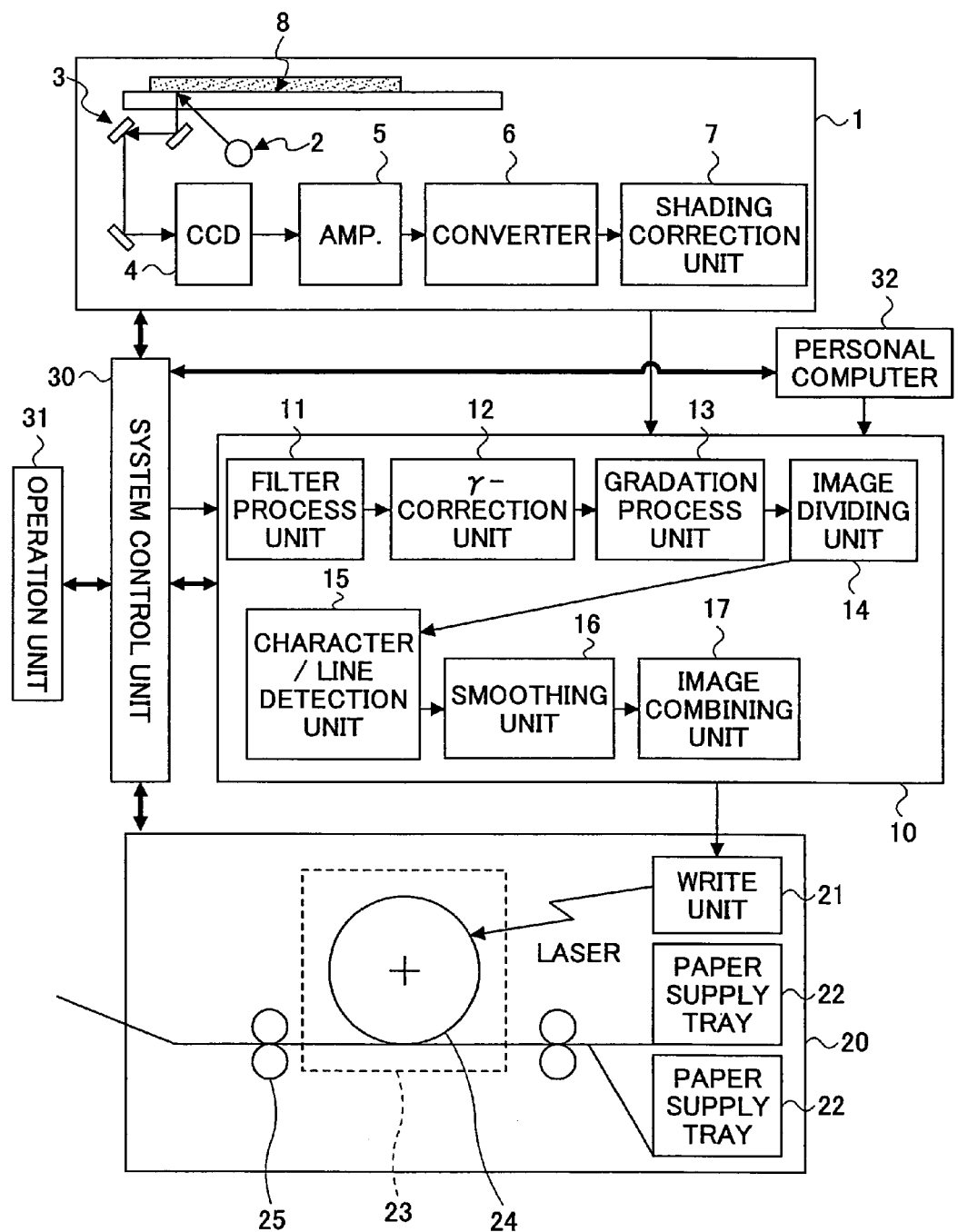
FIG. 1 is a block diagram of an image processing apparatus according to an embodiment of the present invention.

FIG. 1 is a block diagram showing a structure of an image processing apparatus according to an embodiment of the present invention. In FIG. 1, the image processing apparatus comprises an image reading unit 1, an image processing unit 10, an image forming unit 20, a system control unit 30 and an operation unit 31. The image reading unit 1 reads an original document to acquire digital image data and transfers the digital image data to the image processing unit 10. The digital image data is stored in a memory (not shown in the FIGURE). Instead of the image reading unit 1, the image processing apparatus may be provided with a personal computer 32 that can transfer digital image data to the image processing unit 10 through a communication means. It should be noted that the apparatus shown in FIG. 1 can serve as an image forming apparatus.

The image processing unit 10 applies various corrections to the digital image data and binarizes the corrected digital image data. The image forming unit 20 performs a transfer process and a fixation process on the image data supplied from the image processing unit 10. The system control unit 30 controls operations of the entire image processing apparatus. The operation unit 31 is operated by a user to input various instructions to the system control unit 31. The system control unit 30 is capable of controlling a facsimile function so as to convert image data received through a telephone line into digital image data so that the receive image data can be processed by the image processing unit 10.

It should be noted that the personal computer 32 is shown as an electronic equipment such as an information processing apparatus that is connected to the image processing apparatus to perform mutual data communication in the example shown in FIG. 1. The personal computer 32 may be replaced by an electronic equipment, such as a digital camera, which has a memory medium to store image data and is connectable to the image processing apparatus through an interface such as the USB interface, or an SD card, which can be detachably attached to the image processing apparatus.

In the above-mentioned image reading unit 1, a light emitted by a lamp 2 is reflected by a surface of the original document, and is converted into an electric signal by a CCD 4. The electric signal is subjected to an amplitude adjustment by an amplifier 5, and is quantized by an A/D converter 6 so as to be converted into digital image data. The thus-generated digital image data is subjected to a shading correction process by a shading correction unit 7, and is transferred to the image processing unit 10. Additionally, the digital image data stored in a memory area of the personal computer 32 as an information processing apparatus is transferred to the image processing unit 10 through a communication means.

In the above-mentioned image processing unit 10, the digital image data is subjected to a filtering process by a filtering process unit 11 and a $\gamma$-correction process by a $\gamma$-correction unit 12. Then, the digital image data is converted into binary image data by a gradation process unit 13 in accordance with an error diffusion process. The binary image data is then divided by an image dividing unit into a plurality of image portions each containing (n×1) pixels. Each of the thus-divided image portions is subjected to a detection in a character/line drawing detection unit 15 as to whether or not each divided portion corresponds to a character/line drawing portion. Then, a smoothing process according to the result of the detection is applied to the digital image data by a smoothing unit 16. After the smoothing process is completed, the divided image portions are combined with each other by an image combining unit 17 so as to generate binary image data which has been subjected to the smoothing process. Thereafter, the binary image data is transferred to the image forming unit 20.

A write unit 21 of the image forming unit 20 irradiates a laser beam in accordance with the contents of the transferred binary image data onto a photoconductor 24 provided in a transfer unit 23 so as to form an electrostatic latent image, which is a pattern of charges that same as the pattern of the original document, on the surface of the photoconductor 24. Thereafter, a toner is caused to adhere on the surface of the photoconductor 24 to form a toner image, and the toner image is transferred onto a transfer paper fed from a paper supply tray 22. The toner image is subjected to a fixation process such as heat fixation by a fixation unit 25.

Figure 2:
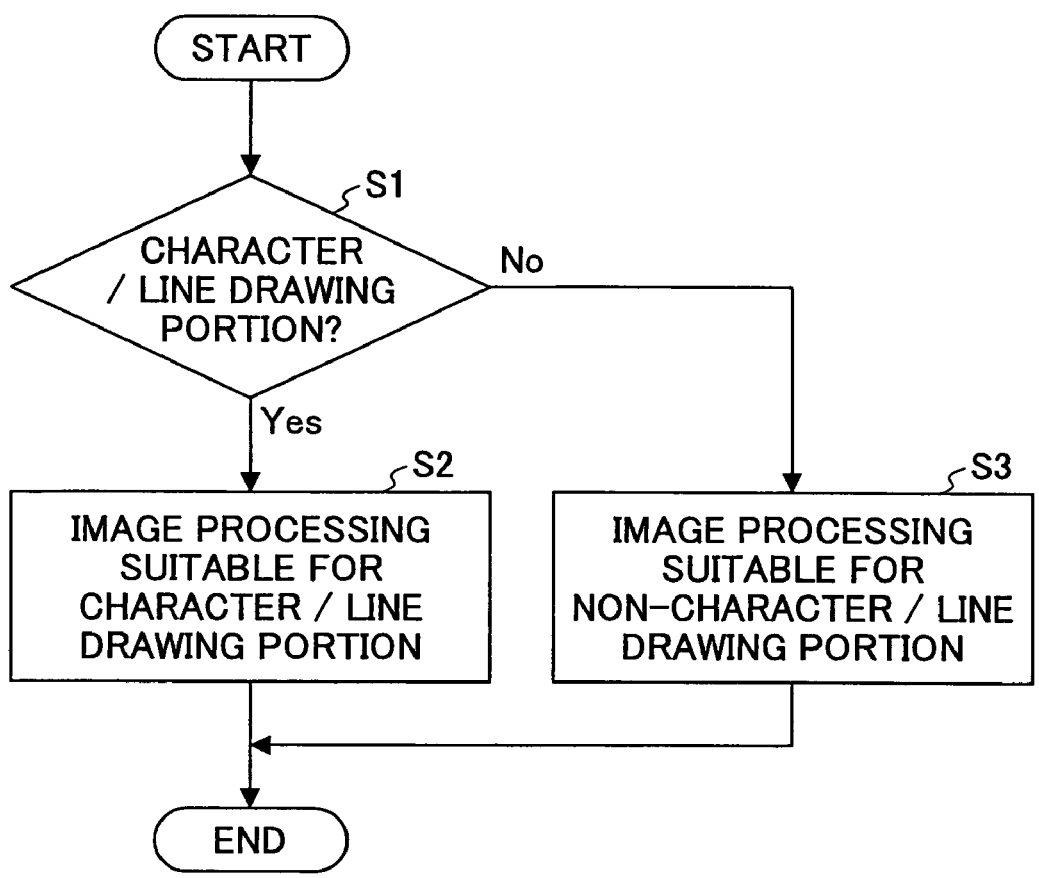
FIG. 2 is a flowchart of a character/line drawing detection process and a smoothing process performed by the image processing apparatus shown in FIG. 1.

FIG. 2 is a flowchart showing the detection the character/line drawing portion from the binary image data and the smoothing process performed by the image processing apparatus according to the present invention. The binary image data which has been binarized by the gradation process unit 13 according to an error diffusion process is divided into image portions by the image dividing unit 14, and a determination is made by the character/line drawing detection unit 15 as to whether the binary image data of each of the divided image portions corresponds to a line/character drawing portion (step S1). If the determination of step S1 is affirmative (Yes of step S1), an image processing suitable for the character/line drawing portion is performed by the smoothing unit 16 on the binary image data corresponding to the divided image portion concerned (step S2). If it is determined that the binary image data corresponding to the divided image portion is not the character/line drawing portion, that is, if it is determined that the binary image data corresponding to the divided image portion is a non-character/line drawing portion (No of step S1), an image processing suitable for the non-character/line drawing portion is performed.

The image processing suitable for the character/line drawing portion in step S2 is an intense smoothing process, which smoothes edges in the character/line drawing portion, that is, gives weight to sharpness. On the other hand, if the intense smoothing process is applied in the image processing performed on the non-character/line drawing portion in step S3, there may be a problem in that a dot shape is collapsed, a degradation reproducibility of an area gradation is deteriorated and a number of gradation levels is reduced. In order to prevent the above-mentioned deterioration in the image quality, a weak smoothing is applied to the image portion determined to be the non-character/line drawing portion, or the smoothing process is not performed on the non-character/line drawing portion. That is, a process, which gives weight to gradation, is performed on the non-character/line drawing portion.

Figure 3:
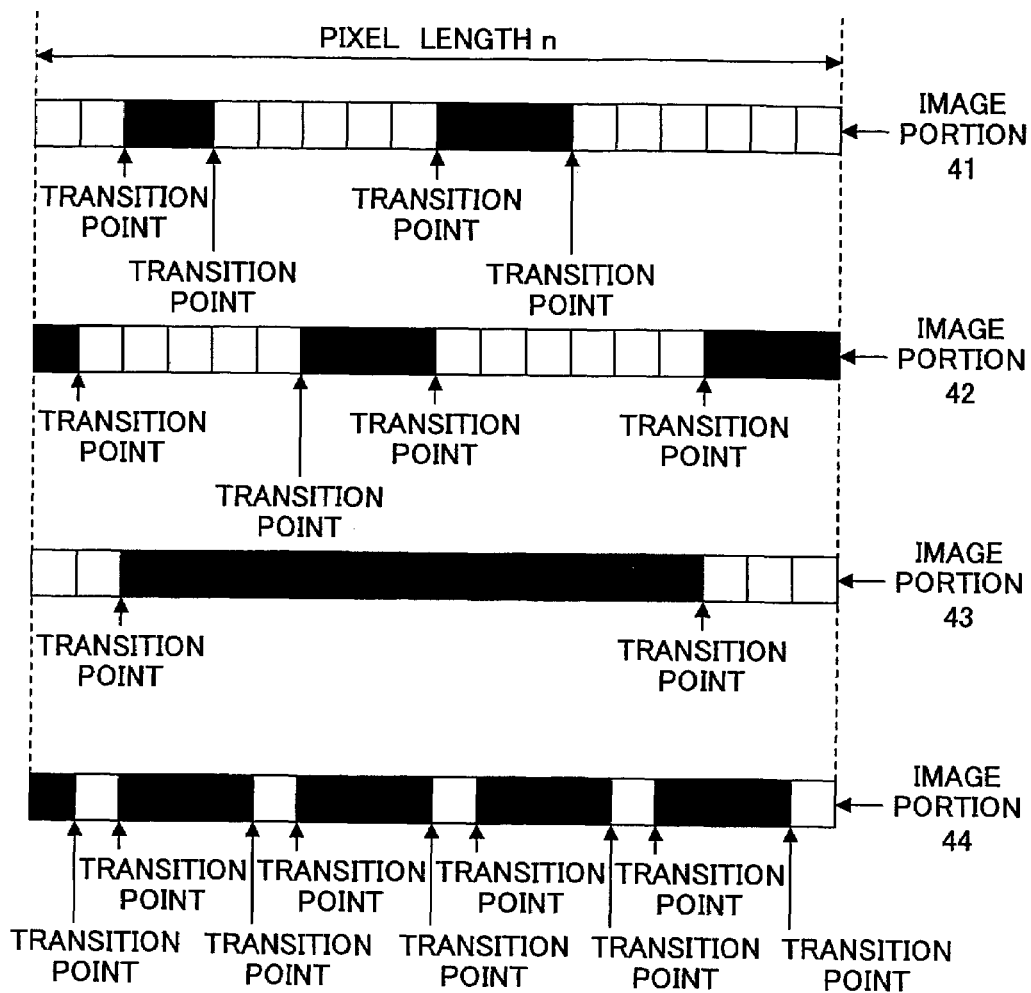
FIG. 3 is an illustration for explaining a method of detecting the character/line drawing portion and a result of the detection.

FIG. 3 is an illustration for explaining a method of detecting the character/line drawing and a result of the detection. In the present embodiment, the binary image is divided along the main-scanning direction. That is, the binary image is divided into a plurality of image portions such as image portions 41 through 44 each of which has (n kakeru1) size, that is, a pixel length of n in the main scanning direction and a width equal to a single pixel. A number C of transition points at which the binary image changes from white to black or black to white is counted in each of the image portions. Then, it is determined whether the image portion is the character/line drawing portion or the non-character/line drawing portion by comparing the number C of the transition points and a predetermined threshold value Th. In the present embodiment, the pixel length n is set to 18 (n=18), and the threshold value is set to 4 (Th=4). In FIG. 3, the image portion 43 is determined to be the character/line drawing portion since the number C of the transition points is smaller than the threshold value Th. On the other hand, the image portions 41, 41 and 44 are determined to be the non-character/line drawing portions such as a photograph since the number C of the transition points is equal to or greater than the threshold value Th.

Generally, when an image binarized according to an error diffusion process in a matrix of (n×n) size, it is considered that a halftone portion such as a photograph portion has more black and white changes than the character/line drawing portion. In the present invention, the determination as to whether the image portion is the character/line drawing portion or the non-character/line drawing portion (photograph part, etc.) is made based on the above-mentioned feature so as to perform an image processing (switching an intensity of smoothing) in accordance with a result of the determination. Here, the image processing is not limited to the smoothing process, and, for example, an edge emphasizing process may be applied to the character character/line drawing portion and a smooth filtering process may be applied to the non-character/line drawing portion.

Figure 4:
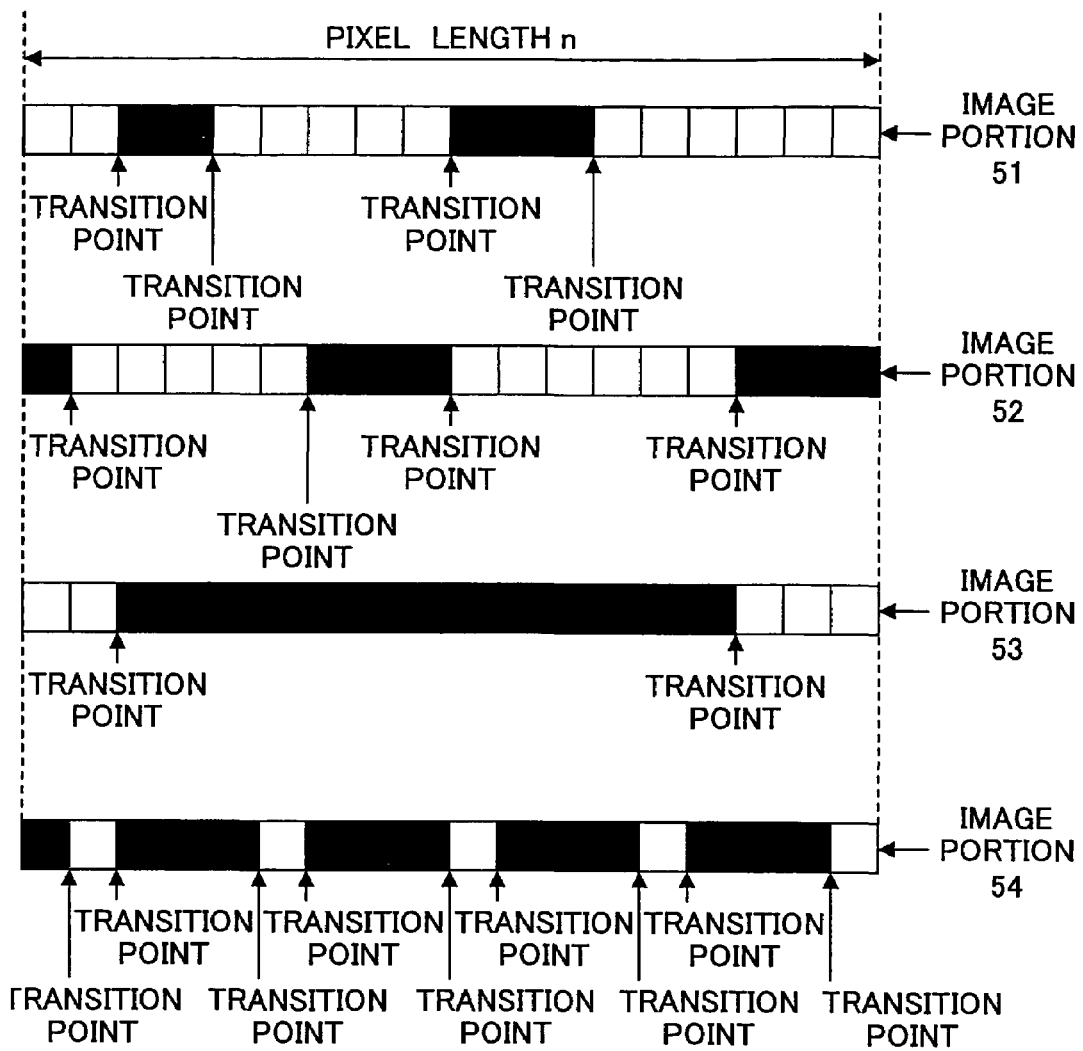
FIG. 4 is an illustration for explaining another method of detecting the character/line drawing portion and a result of the detection.

FIG. 4 is an illustration for explaining another method of detecting the character/line drawing and a result of the detection. Image portions 51 through 54 shown in FIG. 4 correspond to the image portions 41 through 44 shown in FIG. 3, respectively. In the example of FIG. 4, similar to the example of FIG. 3, the pixel length n is set to 18 (n=18) and the threshold value Th is set to 4 (Th=4). The image portions 51m 51 and 53 are determined to be the character/line drawing portion since the number C of the transition points is equal to or smaller than the threshold value Th. On the other hand, the image portion 54 is determined to be the non-character/line drawing portions such as a photograph since the number C of the transition points is greater than the threshold value Th. In the present embodiment, one threshold value Th is prepared so as to compare with the number of transition points to perform the two-stage smoothing process in accordance with the result of the comparison. However, a higher-level binary image processing may be performed by preparing a second threshold value Th2 different from the threshold value Th may be prepared so as to compare the number of transition points with the threshold value Th and the second threshold value Th2 and performs a three-stage smoothing process, or preparing a third threshold value Th3 different from the threshold values Th and Th2 so as to perform a four-stage smoothing process, and so on.

Figure 5:
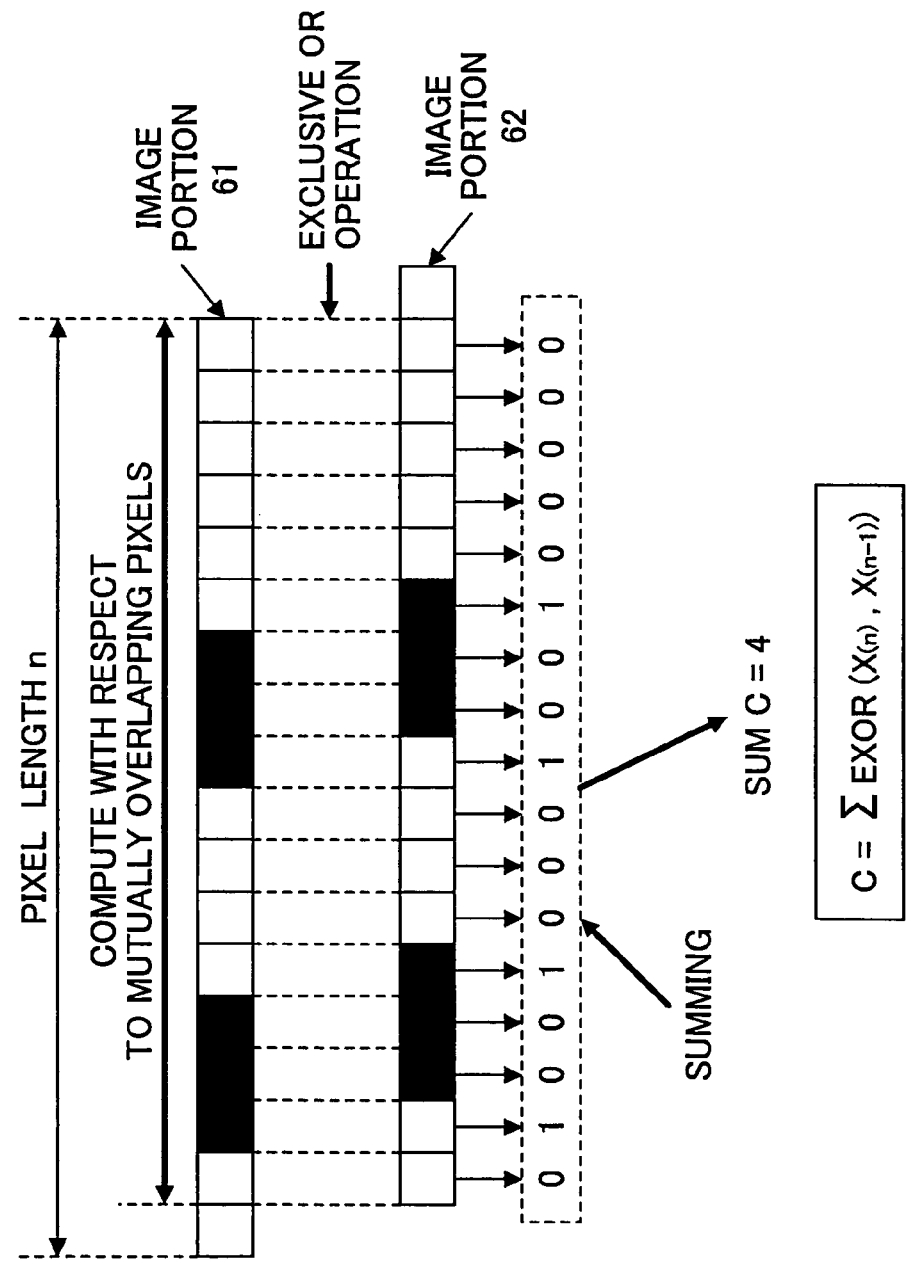
FIG. 5 is an illustration for explaining a method of detecting a transition point.

FIG. 5 is an illustration showing an operation to compute the number of transition points according to the present embodiment. In FIG. 5, an original image portion 61 has a pixel length of N, and an image portion 62 is defined by shifting the image portion 61 by one pixel length in parallel. In the above-mentioned image portions 61 and 62, an exclusive OR operation is performed on the n−1 pixels which overlap mutually.

For example, in order to determine whether or not there is a transition or change between the first pixel and the second pixel on the left side of the image portion 61, an exclusive OR operation is performed on the bit information of the second pixel of the image portion 61 and the bit information of the first pixel of the image portion 62. Since each bit information represents white (bit information=0), the result of the exclusive OR operation is 0. That is, there is no transition or change between the first pixel and the second pixel of the image portion 61.

Similarly, in order to determine whether or not there is a transition or change between the second pixel and the third pixel on the left side of the image portion 61, an exclusive OR operation is performed on the bit information of the third pixel of the image portion 61 and the bit information of the second pixel of the image portion 62. Since the bit information of the third pixel of the image portion 61 represents black (bit information=1) and the bit information of the second pixel of the image portion 62 represents white (bit information=0), the result of the exclusive OR operation is 1. That is, there is a transition or change between the second pixel and the third pixel of the image portion 61.

The above-mentioned operation is performed on each pair of adjacent pixels of the image portion 61, and the output values of the operation are summed so as to obtain the number C of the transition points. In the example of FIG. 5, the number C of the transition points is 4.

Figure 6:
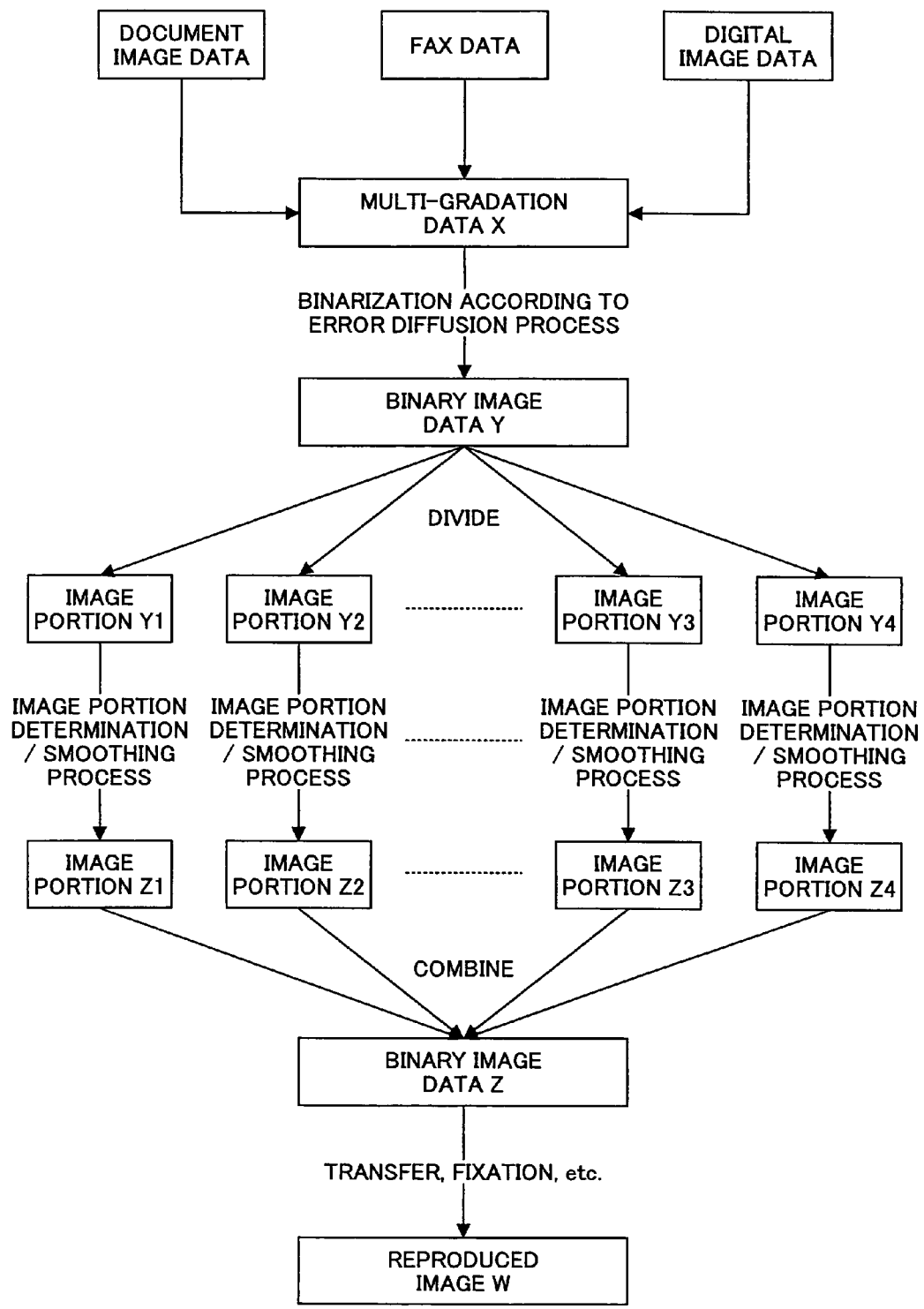
FIG. 6 is an illustration for explaining changes in image data while being processed by the image processing apparatus shown in FIG. 1.

FIG. 6 is an illustration showing changes in the image data through the process performed in the image processing apparatus according to the embodiment of the present invention. In FIG. 6, image data acquired by reading an original document, digital image data sent from a personal computer, or facsimile image data sent from a facsimile apparatus is processed by the image processing unit 10 and the processed image data is supplied to the image forming unit 20. The digital image data (multi-gradation data X) received by a receiving means is subjected to an error diffusion process in the image processing unit 10 so as to be converted into binary image data Y. Then, the binary image data Y is divided into a plurality of image portions Y1-Y4 by the image dividing unit 14, and a character/line drawing determination process is performed by the character/line drawing detection unit 15 on each of the divided image portions Y1-Y4. Then, the smoothing unit 16 performs a smoothing process in accordance with a determination result so as to obtain image portions Z1-Z4. However, there may be a case where the smoothing process is not performed when the image portion is a non-character/line drawing portion. Thereafter, the image combining unit 17 combines the image portions Z1-Z4 so as to return them to binary image data Z. The binary image data Z as image formation data is supplied to the image forming unit 20, and a reproduced image W of high reproducibility is formed in accordance with the binary image data Z.

Here, although the pixel length n is set to 18 (n=18) and the threshold value Th is set to 4 (Th=4) in present embodiment, these values may be set to arbitrary values by inputting through the operation part 31. For example, a use may input appropriate values of the pixel length n and the threshold value 4 by comparing an original image and a reproduced image. Or a suitable value can also be determined by inputting test image data to the image processing unit 10 to form a reproduced image and comparing the reproduced image with a reference image.

In the above-mentioned embodiment, the pixel length of each image portion is set to 18 (n=18) and the threshold value Th is set to 4 (Th=4) so that at least two dots are contained in each divided image portion having a pixel length of n so as to discriminate a halftone dot image such as a photograph or the like (non-character/line drawing portion). FIG. 7 is an illustration of a part of a document image corresponding to a halftone dot portion for explaining a method of determining pixel length and a threshold value. As shown in FIG. 7, if a width W of each dot is 2 (2 pixels) and a dot pitch T is 8 (8 pixels), the pixel length n of each image portion is obtained by n=(T×N)+W where N is a number of dots contained within the pixel length n of each image portion. Therefore, the pixel length n of each image portion is determined as n=(8×2)+2=18, and is set to 18.

Additionally, an image portion containing only two or less dots within the pixel length n can be determined as a halftone dot image. In such a case, a total number of edges of the two dots is 4, and the threshold value Th is set to 4 (Th=4).

It should be noted that the above-mentioned method of determining the values of the pixel length n and the threshold value Th are one example, and these values may be determined by other methods.

As mentioned above, the image processing unit 10 according to the present invention is capable of receiving digital image data and binarizes the received digital image data into binary image data according to an error diffusion process. The image processing unit 10 detects an image portion, which consists of character/line drawings, and selectively applies an image processing such as a smoothing process to the portion of the binary image data, which consists of character/line drawings and the portion of the binary image data, which consists of non-character/line drawings, in accordance with the result of the detection. Thus, a universal image processing apparatus, which can provide high reproducibility, can be provided.

Moreover, the binary image data, which is binarized according to an error diffusion process, is divided into a plurality of image portions each having (n×1) size, that is, a pixel length of n (a line of n pixels), and determines whether each of the image portions is the character/line drawing portion or the non-character/line drawing portion (photograph, etc.) by counting the transition points in each of the image portions and comparing the number of transition points with the threshold value, and selectively applies an image processing such as a smoothing process to the image portion of the binary image data, which consists of character/line drawings and the image portion of the binary image data, which consists of non-character/line drawings, in accordance with the result of the determination. Thus, an image processing apparatus, which can provide high reproducibility, can be provided.

Further, if the number of transition points is smaller than the threshold value, it is determined that the image portion is the character/line drawing portion, and, thus, an intense smoothing process is applied to the image portion, and on the other hand, if the number of transition points is equal to or greater than the threshold value, it is determined that the image portion is the non-character/line drawing portion, and, thus, a weak smoothing process is applied to the image portion or a smoothing process is not applied to the image portion. Thus, an image processing apparatus, which can provide a copy image having high reproducibility, can be provided.

Additionally, if the number of transition points is equal to or smaller than the threshold value, it is determined that the image portion is the character/line drawing portion, and, thus, an intense smoothing process is applied to the image portion, and on the other hand, if the number of transition points is greater than the threshold value, it is determined that the image portion is the non-character/line drawing portion, and, thus, a weak smoothing process is applied to the image portion or a smoothing process is not applied to the image portion. Thus, an image processing apparatus, which can provide a copy image having high reproducibility, can be provided.

Further, the number of transition points, at which the binary image changes from white to black or from black to white, is acquired by performing an exclusive OR operation on each pair of adjacent pixels in an image portion (binary image) of ((n−1)×1) size where a first image portion of (n×1) size overlaps with a second image portion which is obtained by shifting the first image portion by one pixel length in a direction of arrangement of the pixels, and the thus-obtained number of pixels is compared with the threshold value. Thus, an image processing apparatus having an image processing unit of a relatively simple structure can be provided.

The present invention is applicable to an image processing apparatus such as a so-called multi-function machine which has a printer function, a copy function, a facsimile function, etc., and is capable of acquiring image data from a plurality of image data sources, thereby achieving a universal image processing apparatus. Moreover, since the algorithm of the internal processing is comparatively simple, the image processing apparatus does not become large and a relatively inexpensive image processing apparatus can be provided. Therefore, a relatively small company, a personal business office or a personal user can afford the image processing apparatus according to the present invention.

The present invention is not limited to the specifically disclosed embodiments, and variations and modifications may be made without departing from the scope of the present invention.

The present application is based on Japanese priority applications No. 2003-290632 filed Aug. 8, 2003, and No. 2004-217657 filed Jul. 26, 2004, the entire contents of which are hereby incorporated by reference.

What is claimed is:

1. An image processing apparatus for generating image formation data by processing image data, comprising:
   a gradation processing unit that binarizes the image data according to an error diffusion process so as to convert the image data into binary image data;
   a character/line drawing detection unit that determines whether a part of the binary image data corresponds to a character/line drawing portion that consists of characters or line drawings so as to detect the character/line drawing portion;
   an image processing unit that applies an image processing to the part of said binary image data by using an image processing method according to a result of determination of said character/line drawing detection unit; and
   an image dividing unit that divides said binary image data into a plurality of image portions each containing a predetermined number n of pixels which are arranged along a single line, and wherein said character/line drawing detection unit determines, based on the respective single line of pixels, whether or not each of the image portions corresponds to the character/line drawing portion; and
   wherein said character/line drawing detection unit obtains a number of transition points at which the pixels in each of said image portions changes from white to black or from black to white, and determines whether or not each of the image portions corresponds to the character/line drawing portion by comparing the number of transition points with a threshold value.

2. The image processing apparatus as claimed in claim 1, wherein said character/line drawing detection unit obtains the number of transition points by performing an exclusive OR operation on each pair of adjacent pixels in each of the image portions.

3. The image processing apparatus as claimed in claim 1, wherein said character/line drawing detection unit determines that each image portion corresponds to the character/line drawing portion when the number of transition points is equal to or smaller than the threshold value.

4. The image processing apparatus as claimed in claim 1, further comprising an image combining unit that combines the image portions that have been subjected to the image processing by said image processing unit so as to generate said image formation data to be used in an image formation process.

5. The image processing apparatus as claimed in claim 1, wherein said image data is supplied from an image reading unit that acquires the image data by optically reading an original document.

6. The image processing apparatus as claimed in claim 1, wherein said image data is supplied from an electronic equipment connected through a data communication means.

7. The image processing apparatus as claimed in claim 1, wherein said image data is facsimile data supplied through a telephone line.

8. The image processing apparatus as claimed in claim 1, further comprising an image forming unit that forms a visible image by using said image formation data.

9. An image forming apparatus comprising:
   an image processing apparatus that generates image formation data by processing image data; and
   an image forming unit that forms a visible image by using the image formation data supplied from said image processing apparatus,
   wherein said image processing apparatus comprises:
   a gradation processing unit that binarizes the image data according to an error diffusion process so as to convert the image data into binary image data;
   a character/line drawing detection unit that determines whether a part of the binary image data corresponds to a character/line drawing portion that consists of characters or line drawings so as to detect the character/line drawing portion;
   an image processing unit that applies an image processing to the part of said binary image data by using an image processing method according to a result of determination of said character/line drawing detection unit; and
   an image dividing unit that divides said binary image data into a plurality of image portions each containing a predetermined number n of pixels which are arranged along a single line, and wherein said character/line drawing detection unit determines, based on the respective single line of pixels, whether or not each of the image portions corresponds to the character/line drawing portion; and
   wherein said character/line drawing detection unit obtains a number of transition points at which the pixels in each of said image portions changes from white to black or from black to white, and determines whether or not each of the image portions corresponds to the character/line drawing portion by comparing the number of transition points with a threshold value.

10. An image processing method for generating image formation data by processing image data, comprising:
   binarizing the image data according to an error diffusion process so as to convert the image data into binary image data;
   determining whether a part of the binary image data corresponds to a character/line drawing portion that consists of characters or line drawings so as to detect the character/line drawing portion;
   applying an image processing to the part of said binary image data by using an image processing method according to a result of determination in the determining step;
   dividing said binary image data into a plurality of image portions each containing a predetermined number n of pixels which are arranged along a single line;
   determining, based on the respective single line of pixels, whether or not each of the image portions corresponds to the character/line drawing portion;
   obtaining a number of transition points at which the pixels in each of said image portions changes from white to black or from black to white; and determining whether or not each of the image portions corresponds to the character/line drawing portion by comparing the number of transition points with a threshold value; and wherein said image processing method includes the step of transferring an electric signal within an image processing unit.

11. The image processing method as claimed in claim 10, further comprising obtaining the number of transition points by performing an exclusive OR operation on each pair of adjacent pixels in each of the image portions.

12. The image processing method as claimed in claim 10, further comprising determining that each image portion corresponds to the character/line drawing portion when the number of transition points is equal to or smaller than the threshold value.

13. The image processing method as claimed in claim 10, further comprising combining the image portions that have been subjected to the image processing so as to generate said image formation data to be used in an image formation process.

14. The image processing method of claim 13, further comprising storing image data in a memory.

* * * * *

UNITED STATES PATENT AND TRADEMARK OFFICE
CERTIFICATE OF CORRECTION

PATENT NO.        : 7,633,650 B2                                          Page 1 of 1
APPLICATION NO.   : 10/910306
DATED             : December 15, 2009
INVENTOR(S)       : Hiroaki Fukuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Ninth Day of November, 2010

David J. Kappos
*Director of the United States Patent and Trademark Office*